June 15, 1943.  J. M. LEAKE  2,321,829

DRIVING HUB FOR PULLEYS OR GEARS

Filed April 24, 1939

Inventor

James M. Leake

Patented June 15, 1943

2,321,829

UNITED STATES PATENT OFFICE 2,321,829

DRIVING HUB FOR PULLEYS OR GEARS

James M. Leake, Toledo, Ohio, assignor to Toledo Stamping and Manufacturing Company, Toledo, Ohio, a corporation of Ohio Application April 24, 1939, Serial No. 269,683

2 Claims. (Cl. 74—230.8)

My invention relates to driving hubs for pulleys or gears and particularly to the type used in connection with a splined shaft or a key and groove.

Heretofore pulleys and gears have been made from castings or forgings in which the hub is integral with the remainder of the pulley or gear. A hole is drilled or reamed in the hub to the proper size and then grooves or keyways are cut into the hub. This method of making driving hubs for pulleys or gear requires much machining and also much material is wasted in this process, consequently the driving hubs used at the present time are expensive. My improved type of driving hub for pulleys or gears are composed of stampings that are first fabricated and then fastened to the pulley or gear. No machining is required in making the stamped hubs. A stronger material can also be used to make my improved driving hub than can be used in the present type of hub.

One object of my invention is to provide a driving hub for pulleys or gears that radially adapts itself to quantity production.

Another object of my invention is to provide a driving hub for pulleys or gears that is light in weight.

Another object of my invention is to provide a driving hub that eliminates all expensive machining processes.

Another object of my invention is to provide a driving hub for pulleys or gears that is simple, strong, durable and inexpensive.

With these and other objects in view, my invention consists in the construction, combination and arrangement of the various parts of my improved device as described in the specification, claimed in the claims, and illustrated in the accompanying drawing.

Figure 1:
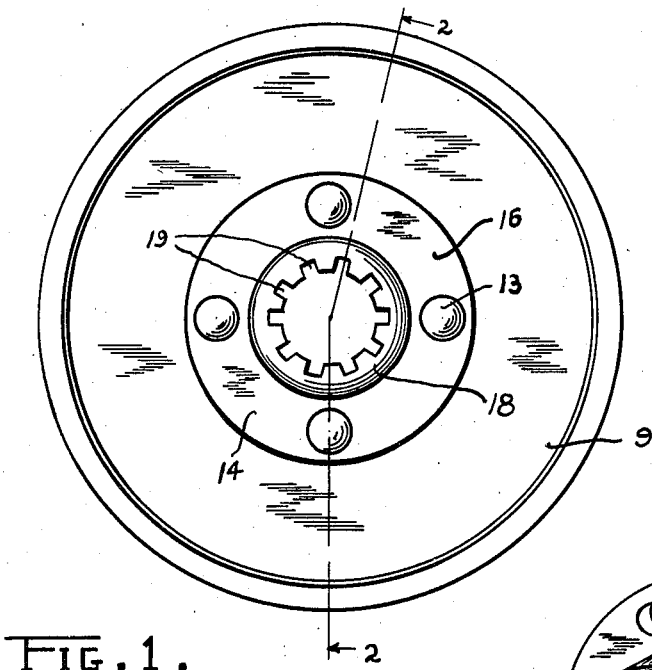
Fig. 1 is a side view of a pulley embodying my invention.
Figure 3:
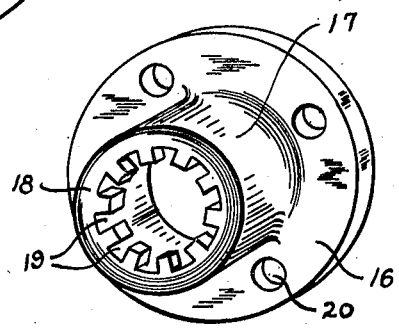
Fig. 3 is a pictorial view of one of the stamped hub members shown in Figures 1 and 2.
Figure 2:
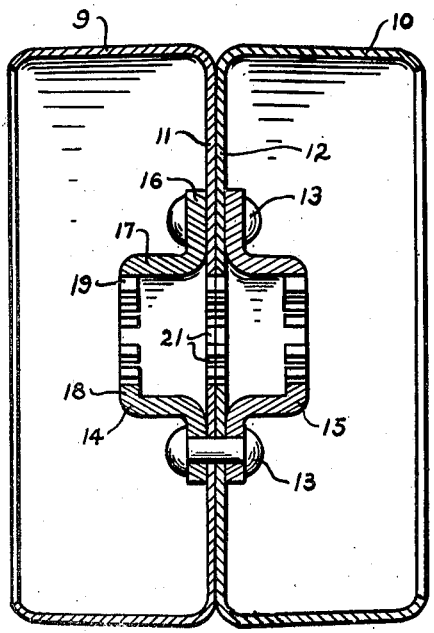
Fig. 2 is a sectional view taken along line 2—2 of Fig. 1.

Referring to the drawing I have shown in Figures 1 and 2 a pulley composed of two stampings 9 and 10. The members 9 and 10 are provided with integral web members 11 and 12. The hub is composed of two stamped members 14 and 15. The entire pulley is assembled as shown in Fig. 2 and then is permanently fastened together by means of the rivets 13.

The hub member 14 has an annular ring portion 16. A cup is drawn from the annular ring portion 16 thus forming an annular flanged portion 17. The bottom of the cup is parallel to the annular ring portion 16. A hole with notches or keyways 19 is then pierced through the bottom of the cup. This forms an annular flanged portoin 18 that is substantially parallel to the annular portion 16 of the hub. Thus a splined hole is formed in the hub without any machining.

The hub 15 is identical to the hub 14. It is placed on the opposite side of the web members 11 and 12 from the hub 14 and the annular flanged portion then extends in the opposite direction.

The hubs 14 and 15 are provided with stamped holes 20 for fastening the hubs and the remainder of the pulley by means of rivets 13 as shown in Fig. 2.

In the form of my invention shown in Fig. 2 the web members 11 and 12 of the pulleys are provided with notches or keyways 21 identical to those in the outer ends of the hub. These keyways 21 may or may not be used depending on the strength desired or the amount of power to be transmitted by the hub.

My improved type of hub construction is adapted for use in connection with a splined shaft, the keyways of the hub engaging with the splines of the shaft for transmitting power from the shaft to the pulley or or vice-versa.

From the foregoing description it can be readily seen that my improved type of driving hub has many advantages over those used at the present time. Greater strength can be obtained with less weight because the metal used in stampings has greater strength per unit weight than does cast or forged metal. It eliminates all expensive machining processes.

It can readily be seen that modification of my invention can be made. In some cases it may be desirable to fasten the pulley and hubs together by copper hydrogen brazing or electric welding. In some cases a hub extending in only one direction from the web members 11 and 12 might give sufficient strength and stability. It can also readily be seen that my type of hub could be used in connection with wheels or gears as well as with a pulley as shown.

While I have described the details of one form of my invention, it is to be understood that I am not to be limited to these details except by the scope of the appended claims.

I claim:

1. A pulley provided with sheet metal hub members fastened to either side of said pulley, said sheet metal hub member comprising an annular ring portion fastened to said pulley, an annular flange portion extending axially from said annular ring portion and a second annular ring portion extending radially inwardly at substantially right angles to said annular flange portion, said second annular ring portion being provided with notches or keyways adapted to engage with a splined shaft for transmitting power, and a web integral with said pulley, said web being provided with keyways adapted to engage with said splined shaft.

2. In combination with a pulley or gear; sheet metal hub members fastened to either side of said pulley or gear, said sheet metal hub members comprising an annular ring portion fastened to said pulley or gear, an annular flange portion extending axially outwardly from said annular ring portion and a second annular ring portion extending radially inwardly at substantially right angles to said annular flange portion, said second annular ring portion being provided with notches or keyways, adapted to engage with a splined shaft for transmitting power, and a sheet metal member interposed between said sheet metal hub members being provided with corresponding notches or keyways adapted to engage with said splined shaft, said sheet metal member interposed between said hub members being an integral part of said pulley or gear.

JAMES M. LEAKE.